United States Patent [19]

Hehl

[11] 4,105,385
[45] Aug. 8, 1978

[54] COMPACT DIE CLOSING UNIT FOR INJECTION MOLDING MACHINES

[76] Inventor: Karl Hehl, Arthur-Hehl-Strasse 32, 7298 Lossburg 1, Fed. Rep. of Germany

[21] Appl. No.: 815,853

[22] Filed: Jul. 14, 1977

[30] Foreign Application Priority Data

Jul. 14, 1976 [DE] Fed. Rep. of Germany ....... 2631603

[51] Int. Cl.² ............................................. B29F 1/00
[52] U.S. Cl. ................................ 425/192 R; 425/190; 425/450.1; 425/451.2; 425/451.9; 425/444; 425/589; 425/556; 425/595; 425/590; 249/68
[58] Field of Search ................ 429/190, 450.1, 451.2, 429/192, 451.9, 589, 591, 595, DIG. 223

[56] References Cited

U.S. PATENT DOCUMENTS

| | | | |
|---|---|---|---|
| 2,689,978 | 9/1954 | Roger | 425/451.2 |
| 2,916,768 | 12/1959 | Quéré et al. | 425/451.2 |
| 2,976,569 | 3/1961 | Quéré et al. | 425/451.2 |
| 3,613,171 | 10/1971 | Hehl | 425/451.2 |
| 3,669,599 | 6/1972 | Snider et al. | 425/451.2 X |
| 3,687,590 | 8/1972 | Cyriax | 425/450.1 X |
| 3,782,874 | 1/1974 | Hehl | 425/190 |
| 3,914,082 | 10/1975 | Hehl | 425/192 |
| 3,940,930 | 3/1976 | Rosander | 425/451.2 X |
| 3,951,579 | 4/1976 | Myers et al. | 425/190 |
| 4,005,974 | 2/1977 | Sgabo | 425/450.1 |
| 4,021,181 | 5/1977 | Hehl | 425/450.1 |
| 4,025,264 | 5/1977 | Hehl | 425/190 |

*Primary Examiner*—J. Howard Flint, Jr.
*Attorney, Agent, or Firm*—Joseph A. Geiger

[57] ABSTRACT

A compact die closing unit for injection molding machines with four pull-type hydraulic linear actuators and an oversize multi-plate injection molding whose stationary die plates engage the piston rods with centering bores, thereby extending the piston rod support in the die separation plane, and whose movable die plates similarly engage the piston rods with centering bores, so as to be carried by the piston rods directly, without the need for a movable die carrier plate and a stationary cantilever frame supporting the latter. The hydraulic supply lines for the power piston bypass control valve are arranged in the auxiliary cylinders.

13 Claims, 5 Drawing Figures

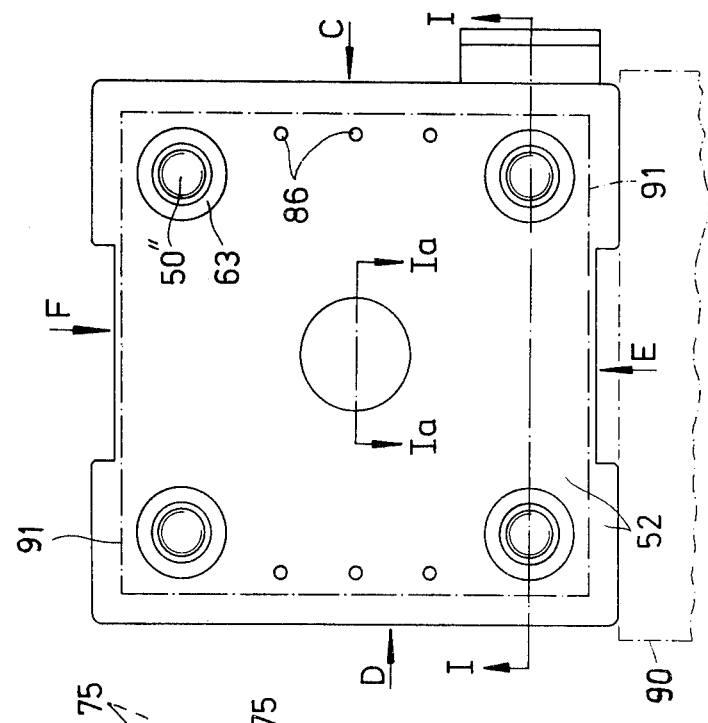
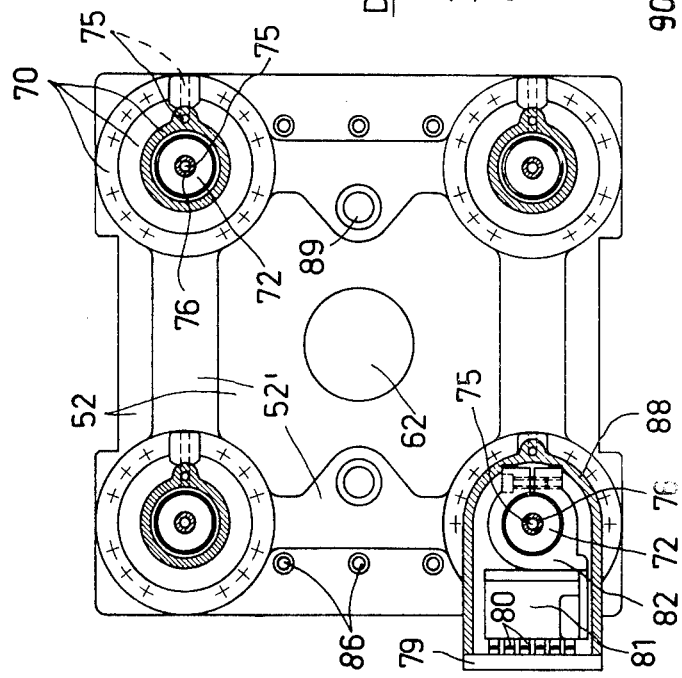

COMPACT DIE CLOSING UNIT FOR INJECTION MOLDING MACHINES

BACKGROUND OF THE INVENTION

1. Field of the Invention

The present invention relates to machines for the injection molding of plastic or metallic parts and articles, and, more particularly, to die closing units of injection molding machines which hold a multi-plate injection molding die, opening and closing the latter hydraulically by means of pull-type hydraulic actuators whose piston rods reach over or through the injection molding die.

2. Description of the Prior Art

Injection molding machines with pull-type die closing units are known in a number of versions and design variations. Generally, such a die closing unit has a stationary die carrier plate attached to, or integrally combined with a cylinder mount which accommodates two or four hydraulic linear actuators. The latter have parallel piston rods which move in unison and extend at right angles to the stationary die carrier plate, the far ends of the piston rods reaching a distance beyond said plate. To the far ends of the piston rods is rigidly attached a die carrier plate which is movable towards and away from the stationary die carrier plate. The two plates have suitable die mounting faces against which can be mounted the constituent plates of a multi-plate injection molding die. The action of the linear actuators of the die closing unit, by moving the movable die carrier plate and attached die half, opens and closes the injection molding die.

This type of die closing unit may be subject to undesirable bending conditions at the long piston rods, especially when only two linear actuators are used, or when the space requirements of the injection molding die and a long opening stroke necessitate very long piston rods, even when four linear actuators are used. In order to eliminate these bending conditions, it is therefore common practice to provide a stationary support for the movable die carrier plate in the form of a cantilever frame which is rigidly mounted to the machine base. The movable die carrier plate engages this guide frame with suitable guide rollers. Such a guide frame, in addition to increasing the complexity and cost of the die closing unit, has the disadvantage of restricting the accessibility of the injection molding die from underneath.

A die closing unit of the type described above is disclosed in U.S. Pat. No. 4,025,264. This prior art structure features four linear actuators having piston rods which reach through all the plates of the die closing unit, the far ends of the piston rods being attached to a movable die carrier plate which is supported on a stationary cantilever guide frame. In this prior art die closing unit, the injection molding die consists of two stationary die plates, of which one is a mounting plate and the other a mold plate, and two movable die plates, of which one is likewise a mold plate and the other serves as an ejector plate. The four plates, plus the movable die carrier plate to which the ejector plate and movable mold plate are attached, require rather long piston rods which would deflect under the weight of the plates, without a suitable stationary support for the movable die carrier plate.

The prior art die closing unit which is disclosed in U.S. Pat. No. 4,025,264 also features oversize die plates which embrace the four piston rods with guide bores, thereby being centered on the piston rods. The primary advantage of these oversize die plates is that they make it possible to arrange a larger mold cavity in the injection molding die. However, the use of oversize die plates is only then possible, when the piston rods of the die closing unit are retractable in the axial direction, for the purpose of inserting and removing the die plates. The oversize die plates also have the additional advantage of providing a degree of support for the extended piston rods, the guide bores of the mounting plate and of the stationary mold plate providing an axial extension of the piston rod support which would otherwise end at the stationary die carrier plate, where the piston rods emerge from the linear actuators. Yet, even this extension of the piston rod support to the separation plane of the injection molding die cannot entirely eliminate the need for a stationary support frame underneath the movable die carrier plate, especially in the case of heavy-duty injection molding machines, or in the case of machines which require a great amount of space for the injection molding die and a long opening stroke.

SUMMARY OF THE INVENTION

It is therefore a primary objective of the present invention to devise an improved die closing unit of reduced weight and shortened overhang, without thereby lessening the space which is available for the injection molding die itself, so that the stationary cantilever support which has been necessary for prior art die closing units of this type can be dispensed with. Another objective of the present invention is to provide unobstructed access to the injection molding die from all sides of the die closing unit.

The present invention proposes to attain this objective by suggesting a die closing unit which combines the use of oversize die plates with a novel configuration in which the far ends of the four piston rods are attached directly to the ejector plate of the multi-plate injection molding die. By thus eliminating the movable die carrier plate, the overhanging portion of the die closing unit is not only made much lighter in weight, it also becomes shorter, so that the bending moments on the four extended piston rods are reduced to such a degree that the piston rods are capable of carrying the remaining removable plates of the injection molding die without requiring a special stationary support. This novel configuration thus makes it possible to use even heavy-duty die closing units without a stationary support under the movable plates. Obviously, the shortened die closing unit also requires correspondingly less floor space for the injection molding machine.

In a preferred embodiment of the invention, the overhanging portion of the die closing unit is also completely free of electrical and hydraulic connections, reflecting itself in a simplified design and in greater ease of access to the die closing unit for servicing and exchange, as when a different injection molding die is to be mounted in the unit. In the novel die closing unit, this result is achieved by arranging the hydraulic supply lines for the bypass control valves of the power pistons in conjunction with the auxiliary cylinders which are coaxially attached to the rear extremities of the power cylinders. For this purpose, the piston rods, which reach rearwardly into the auxiliary cylinders, have each a central bore in their rear portion into which extends a stationary supply tube, so that a supply communication is established between a connection on the outside of each auxiliary cylinder and an annular bypass control valve for the associated power piston which is seated on the piston rod, inside the power cylinder.

Lastly, the invention suggests that only two diagonally opposite auxiliary cylinders be utilized for the generation of the rapid opening and closing movements of the die closing unit, while one of the remaining two auxiliary cylinders be modified to have the form of an enlarged housing inside which is arranged an electrical switch unit. The latter may consist of one or several switches which move axially with the piston rod and cooperate with adjustable stationary switching cams which are mounted on a suitable cam board.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows:

FIG. 4 is an end view of the die closing unit of FIG. 1, as seen along arrow B, with the die plates removed; and FIG. 5 is an end view of the die closing unit of FIG. 1, as seen along arrow A.

DESCRIPTION OF THE PREFERRED EMBODIMENT

Figure 1:
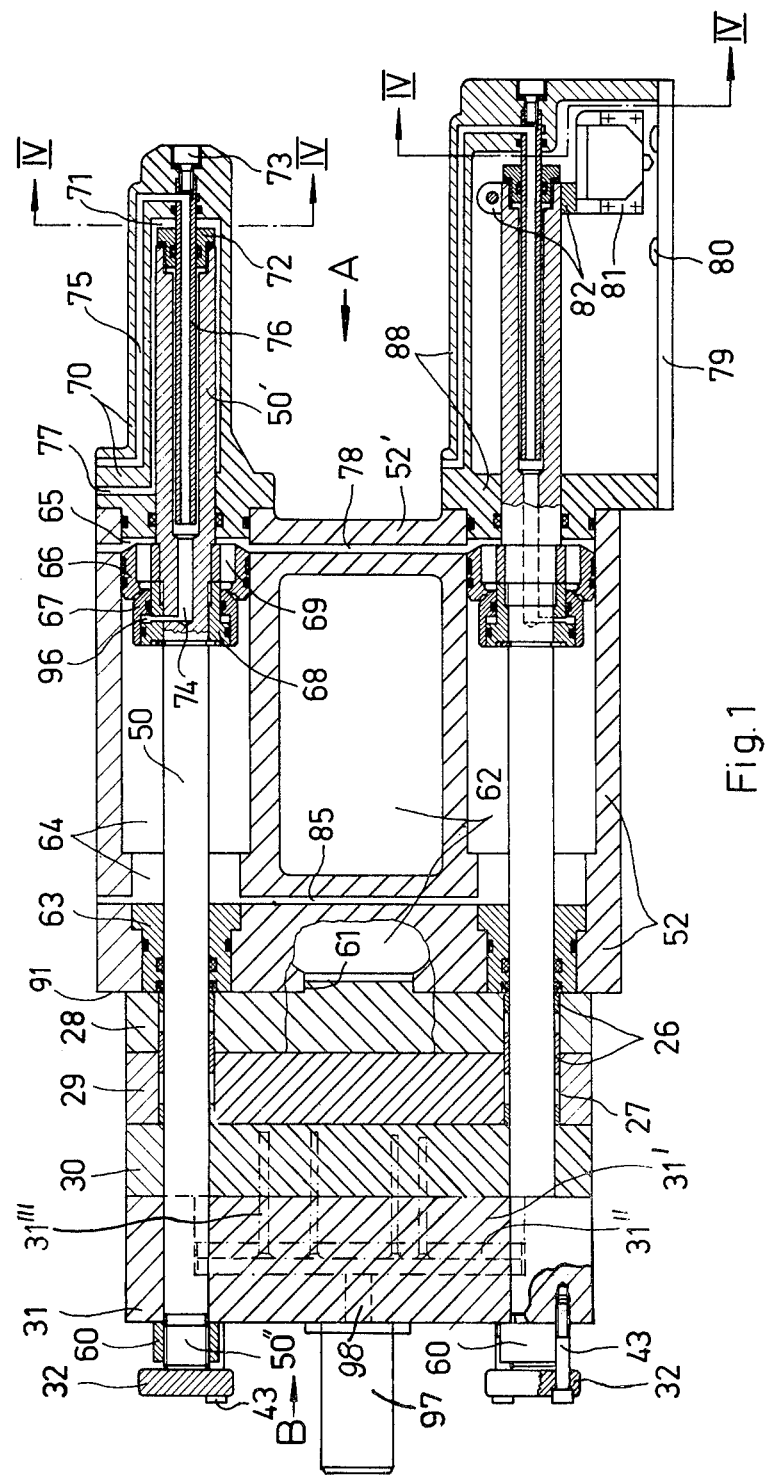
FIG. 1 shows an embodiment of the die closing unit of the invention in a longitudinal cross section, taken along line I—I of FIG. 4, with an insert portion cross-sectioned along line Ia—Ia of FIG. 4, the die closing unit being shown in the closed position.

Referring to the drawing, there is illustrated a preferred embodiment of the invention, represented by a pull-type die closing unit for an injection molding machine. The central component of this die closing unit is a stationary die carrier member 52 in the form of a hollow block or cylinder mount, with four parallel cylinder bores as part of the hydraulic linear actuators which operate the die closing unit. The axes of the four cylinders are preferably located at the four corners of a square.

Figure 2:
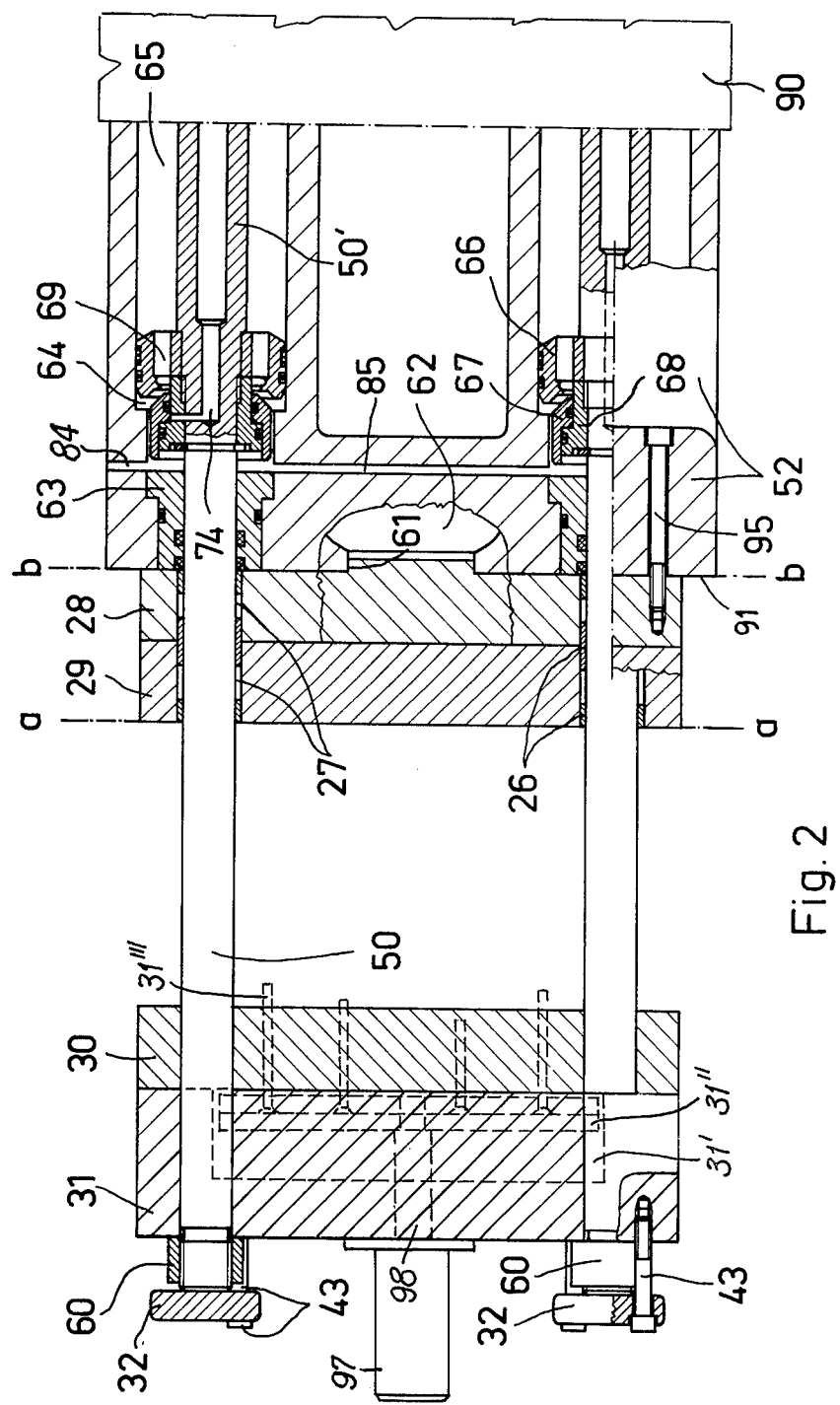
FIG. 2 shows a portion of the die closing unit of FIG. 1 in an open position.

The stationary die carrier member 52 itself has an outwardly square outline (FIGS. 4 and 5), being supported on top of a machine base 90 (FIGS. 2 and 4) of the injection molding machine (not shown). On its forward side, the stationary die carrier member 52 has a vertically oriented flat die mounting face 91 which is outlined by a stippled line in FIG. 4. The plane defined by this die mounting face is located in approximate alignment with the forward edge of the machine base 90, so that the remainder of the die closing unit overhangs the machine base.

To the die mounting face 91 of the stationary die carrier member 52 are attached two stationary die plates 28 and 29, plate 28 being the sprue plate, and plate 29 being the stationary mold cavity plate. Facing this stationary half of the injection molding die is a matching movable half of the die which again consists of two die plates, a movable mold cavity plate 30, and an ejector plate 31. Like the plates 28 and 29 of the stationary die half, the plates 30 and 31 of the movable die half are clamped together, the ejector plate 31, in turn, being rigidly attached to the distal extremities of the four piston rods 50 of the four hydraulic linear actuators which operate the die closing unit. The manner in which the various plates of this multi-plate injection molding die are mounted and attached will be described in more detail further below.

While the sprue plate 28 of the stationary die half has a centering collar 61 with which it engages a matching bore portion of a central aperture 62 of the stationary die carrier member 52, it and the adjoining mold cavity plate 29 are axially clamped against the die mounting face 91 of member 52 by means of axial clamping bolts 95 and 86, the latter being shown in FIGS. 4 and 5. The die plates 28 and 29 thus form a rigid extension of the stationary die carrier member 52. As can be seen in the drawing, the radial dimensions of the die plates 28 and 29 are such that they encompass the locations of the four piston rods 50, with the result that the die plates embrace the piston rods. The piston rods 50 can thus be utilized as centering members for the die plates, while the latter, through their rigid connection with the stationary die carrier member 52, provide a support for the piston rods 50 in the form of axial extensions of the guide bores through which the piston rods 50 emerge from their cylinder spaces 64. While these guide bores are arranged inside suitable end covers 63 which are mounted in the front plate of the stationary die carrier member 52, the corresponding guide bores in the two stationary die plates 28 and 29 are part of axially spaced bearing sleeves 26 which are pressed into the die plates. Annular chambers 27 between the bearing sleeves 26 serve to improve the guiding engagement with the piston rods 50. One of the bearing sleeves 26 is preferably so arranged that it reaches partially into the sprue plate 28 and partially into the adjoining mold cavity plate 29, thereby serving as an intermediate centering member.

The movable half of the injection molding die is attached to and carried by the four piston rods 50 which reach through the movable mold cavity plate 30 and through the ejector plate 31 with the same diameter with which they emerge from the end covers 63 of the stationary die carrier member 52. The forward extremities of the piston rods 50 extend a distance beyond the ejector plate 31, where each piston rod has a threaded end portion 50''. On the latter is seated a threaded abutment nut 60 with which the piston rod is axially positioned against the outer face of the ejector plate 31, being clamped against the latter by means of a clamping plate 32 which engages the extremity of the piston rod 50. Several rod clamping bolts 43 provide a releasable rigidly preloaded clamping attachment between each of the four piston rods and the ejector plate 31.

As is shown in dotted lines in FIG. 1, the ejector plate 31 has a central cavity 30' which is open towards the adjoining mold cavity plate 30 and which accommodates an ejector flange 31'' holding a plurality of axially extending ejector pins 31'''. A small ejector piston 97 is arranged centrally on the outer side of the ejector plate 31, the piston rod 98 of the ejector piston 97 being attached to the movable ejector flange 31'', so that the latter can be moved towards and away from the mold cavity plate 30, when a finished molded article is to be ejected from the open injection molding die. The movable mold cavity plate 30 is attached to the ejector plate 31 by means of suitable clamping bolts (not shown), and both plates are centered and positioned relative to one another and relative to the stationary die plates 28 and 29 by the four piston rods 50.

The proposed use of oversize die plates and of piston rods which reach through all the die plates with the same unchanging diameter thus makes it possible to completely eliminate the previously necessary movable die carrier plate to which the ejector plate and movable mold cavity plate are normally attached. The elimination of this heavy die carrier plate not only removes a considerable weight from the extremities of the piston rods 50, it also reduces the unsupported length of the latter which is already being reduced considerably as a result of the previously mentioned extension of the piston rod guide bores from the stationary die carrier member 52 to the die partition plane at the forward side of the stationary die half. This simultaneous reduction of the free bending length of the piston rods 50 from both sides give the piston rods sufficient support and rigidity that the stationary support underneath the movable die plates can be safely dispensed with. Its removal, besides representing a design simplification and a corresponding reduction in the cost of the unit, gives full accessibility to the injection molding die from underneath, where access would have been restricted by the presence of a stationary cantilever support. The multi-plate die assembly is thus fully accessible from five sides which are indicated in FIGS. 1 and 4 by the arrows B, C, D, E, and F.

Figure 3:
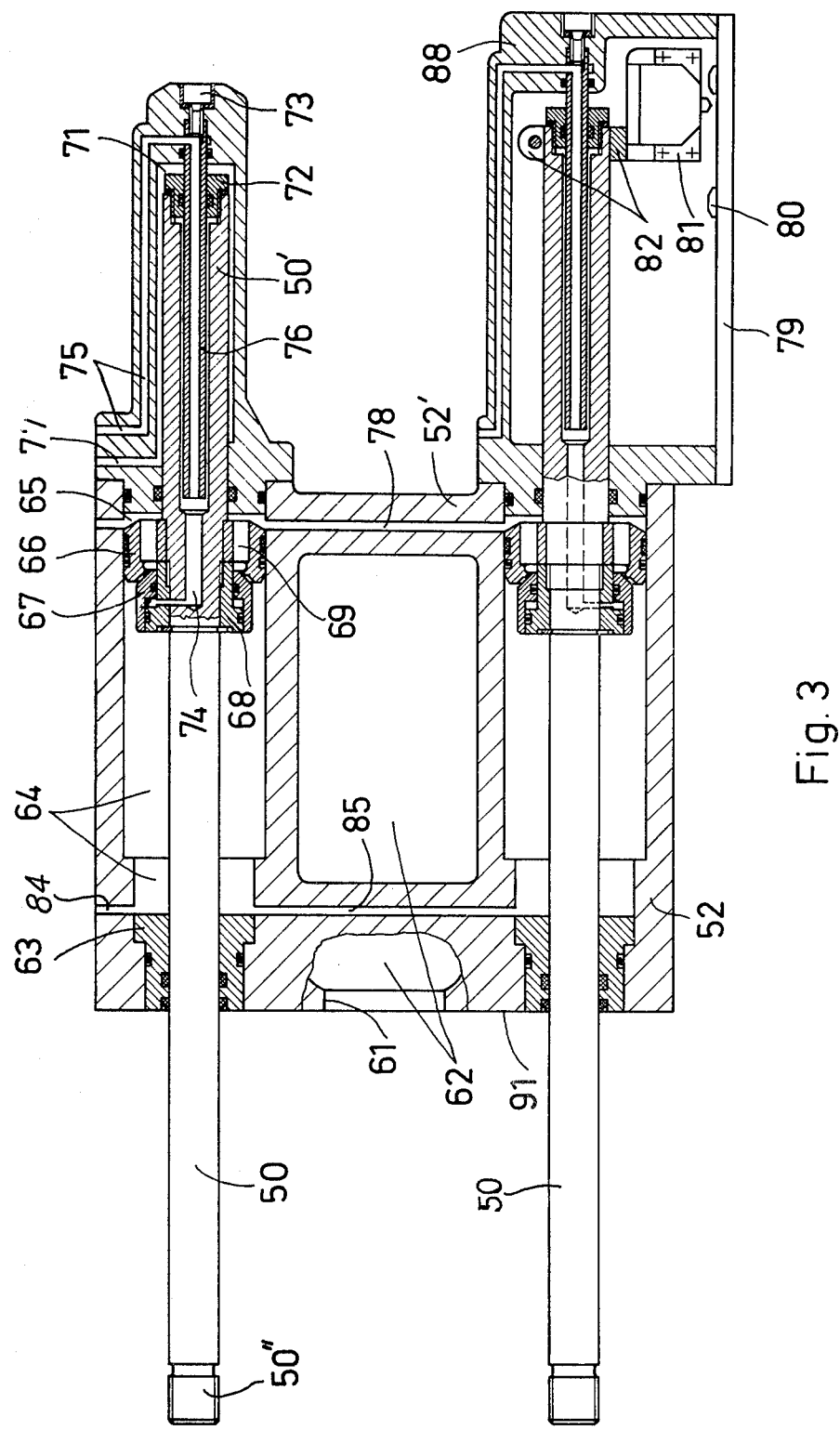
FIG. 3 shows the die closing unit of FIG. 1, with the injection molding die removed.

When a particular injection molding die is to be exchanged against another die, the rod clamping bolts 43 are unscrewed, the clamping plates 32 removed, and the abutment nuts 60 unscrewed from the threaded extremities 50" of the piston rods 50. The release of the plate clamping bolts 86 and 95 now makes it possible to remove the four constituent plates 21-31 of the injection molding die from the die closing unit by simply sliding the die plates forwardly out of engagement with the piston rods 50. The bare piston rods 50 are shown in FIG. 3. The new injection molding die is mounted in a reverse operation by sliding them over the four piston rods 50. As mentioned earlier, the die plates are conveniently guided and centered on the four piston rods, so that the assembly operation is an extremely simple one.

The full accessibility of the injection molding die from all sides now also makes it possible to arrange lateral injection in the die separation plane from any direction, or to provide special accessory devices, such as devices for the insertion of parts and for the unscrewing of threaded cores, for example, from any one of the four lateral sides of the injection molding die.

Access to the injection molding die is further improved, and the die closing unit of the present invention is further simplified, by eliminating all hydraulic and electrical connections from the injection molding die and supporting piston rods 50. This contrasts with many prior art die closing units, especially those of the type using coaxial power cylinders and auxiliary cylinders, where hydraulic connections are necessary on the forward extremities of the piston rods 50, in order to hydraulically control the operation of the power piston bypass valves which are seated on the piston rods. In the improved die closing unit of the invention, these hydraulic connections are arranged in the rear portion of the die closing unit, in conjunction with its auxiliary cylinders. This arrangement is shown in FIGS. 1 and 3, and it operates as follows:

The four large bores in the stationary die carrier member 52 which accommodate the power pistons of the hydraulic linear actuators define pressure spaces 64 and 65 ahead and behind each power piston 66. The axial closures for these pressure spaces are provided by the earlier-mentioned end covers 63 on one side and by the auxiliary cylinders 70 on the other side of the power cylinders. The auxiliary cylinders 70, which are coaxially aligned with the bores 64/65 of the power cylinders, cooperate with larger-diameter rear portions 50' of the piston rods 50.

In each power piston are arranged a number of axial bypass channels 69 which are openable and closable by means of an annular bypass control valve 67/68 to be described further below. The bypassable power pistons 69, in combination with the larger-diameter rear portions 50' of the piston rods which cooperate with the auxiliary cylinders 70, allow for the generation of rapid opening and closing movements of the die closing unit, as well as for the creation of an elevated closing pressure, when the injection molding die is to be held closed during the injection cycle.

To obtain a rapid closing movement, the front and rear pressure spaces 64 and 65 of the power cylinder are pressurized simultaneously, while the bypass channels 69 of the power piston are held open. The stepped diameters of the piston rod 50 now act in the manner of a differential piston, whereby the piston rods are being moved rearwardly until the injection molding die is closed. At this point, the bypass control valve of the power piston 66 is closed and only the front pressure space 64 of the power cylinder remains pressurized, so that an elevated closing pressure is generated. A rapid die opening motion is obtained by pressurizing the pressure chamber 71 which surrounds the rear portion 50" of the piston rod inside the auxiliary cylinder 70, while maintaining open the bypass control valve 67/68 of the power piston, so that the power piston simply moves through the non-pressurized fluid in the power cylinder.

The bypass control valve of the power piston 66 consists essentially of a supporting sleeve 68 which is seated on the forward side of the power piston, preferably clamping the latter axially against a shoulder of the piston rod 50, at its transition to the larger-diameter rear portion 50'. Cooperating with the supporting sleeve 68 is an annular piston 67 in the form of a valve member which is axially movable relative to the supporting sleeve 68 and which thereby opens and closes the bypass channels 69 of the power piston 66.

In order to produce the movements of the annular valve piston 67, there is provided a central piston rod bore 74 which reaches through the rear portion 50' of the piston rod to a point in alignment with the bypass control valve. A stationary supply tube 76 extends from the rear extremity of the auxiliary cylinder into the piston rod bore 74, engaging a suitable piston rod end cap 72 with a sliding seal. The stationary supply tube 76 is held in place by means of a screw 73. A hydraulic supply bore 75 in the body of the auxiliary cylinder 70 leads from the outside of the latter to the rear extremity of the stationary supply tube 76. A similar supply bore 77 leads to the pressure chamber 71 of the auxiliary cylinder. A radial supply bore connects the inner extremity of the piston rod bore 74 with a valve pressure chamber 76 which, when pressurized, causes the annular valve piston 67 to advance against the main piston 66, where it engages a suitable valve seat which surrounds the piston bypass channels 69, thereby closing the latter.

The four hydraulic linear actuators operate in unison, and the front and rear pressure spaces of the power cylinders inside the stationary die carrier member 52 communicate through connecting channels 78 and 85. However, since the rapid opening and closing movements of the die closing unit require only a moderate force, the present invention further suggests that only a pair of two diagonally opposite auxiliary cylinders be used to generate the rapid opening motion, as described further above. One of the remaining auxiliary cylinders can then be modified from its original purpose as auxiliary cylinder to take the form of an enlarged housing 88 inside which is arranged an electrical switching unit for the control of various adjustable movement functions. For this purpose, the rear portion 50' of the associated piston rod carries near its rear extremity a switch block 81 which is clamped to the piston rod by means of a hub clamp 82. The switch block 81 cooperates with a number of longitudinally adjustable switching cams 80 (see especially FIG. 5) which are mounted on a cam board 79. The switches of the switch block 81 may be used to control such operating parameters as pressure changes, the length of opening stroke, and/or a safety interlock for the closed position of the die closing unit.

In FIG. 5 can also be seen the mounting ears 89 for an injection unit whose plastification cylinder is designed to reach through the central aperture 62 of the stationary die carrier member 52. Suitable connecting ribs 52' extend between the four power cylinders which are part of an integral die carrier casting, thereby stiffening the latter and providing a rigid support for the mounting ears 89. Of course, it is also possible to arrange an injection unit in alignment with the separation plane of the injection molding die, in which case it is necessary to bolt a suitable angle support to the top side of the stationary die carrier member 52.

It should be understood, of course, that the foregoing disclosure describes only a preferred embodiment of the invention and that it is intended to cover all changes and modifications of this example of the invention which fall within the scope of the appended claims.

I claim:

1. In a machine for the injection molding of plastic or metallic parts and articles in an injection molding die, a die closing unit which opens and closes along a longitudinal movement axis, the die closing unit being adapted for mounting on a machine base and comprising in combination:
   a stationary die carrier member adapted for attachment to the machine base, said member having on its forward side a die mounting face extending perpendicularly to said movement axis;
   at least two hydraulic linear actuators having parallel stationary power cylinders which are solidary with the stationary die carrier member and which enclose an equal number of power pistons, each having a piston rod attached thereto, the piston rods extending forwardly through the stationary die carrier member, on opposite sides of, and parallel to said movement axis;
   a stationary die half as part of the injection molding die, said die half being constituted by at least one transversely extending stationary die plate which is clamped against the die mounting face of the stationary die carrier member, said at least one stationary die plate engaging a length portion of each piston rod with a fitted bore, so as to support and guide the piston rods;
   a movable die half as part of the injection molding die, said movable die half being likewise constituted by at least one transversely extending movable die plate, said at least one movable die plate having fitted bores engaging a forward end portion of each piston rod, so as to support the movable die half on said rods; and
   axial clamping means for releasably clamping the forward end portions of the piston rods to a forwardly facing clamping face on the front side of the movable die half.

2. A die closing unit as defined in claim 1, wherein
   the movable die half includes an ejector plate at the forward side thereof and a mold plate at the rear side thereof, the ejector plate being that part of the movable die half to which the forward end portions of the piston rods are clamped;
   the ejector plate includes means for ejecting molded articles from the opened injection molding die, including ejector members reaching rearwardly through said mold plate; and
   said fitted bores of the movable die half are bores of identical diameter in both said plates the mold plate bores thereby serving to position and center the mold plate in relation to the ejector plate.

3. A die closing unit as defined in claim 2, wherein
   the fitted bores of the movable die half and the fitted bores of the stationary die half are of identical diameter; and
   the length portions of the piston rods which are engaged by said bores have the same diameter as the length portions of the piston rods which extend longitudinally between the said die halves.

4. A die closing unit as defined in claim 3, wherein
   the stationary die half includes a mold plate at the forward side thereof and a sprue plate at the rear side thereof;
   the fitted bores of the stationary die half extend through both plates, being formed by guide bushings arranged in said plates; and
   at least two of said guide bushings are so arranged that they extend from one plate into the other, thereby positioning and centering the mold plate on the sprue plate.

5. A die closing unit as defined in claim 1, wherein
   said axial clamping means includes, on each piston rod end portion: a threaded length portion extending a distance beyond the clamping face of the movable die half, and carrying thereon a threaded abutment nut with an axial abutment face bearing against said clamping face, and a clamping plate bearing against the forward extremity of the piston rod, under the tension of at least one axial clamping fastener which engages the clamping plate and the movable die half.

6. A die closing unit as defined in claim 5, wherein
   the piston rods have a uniform diameter extending over a length which includes the threaded length portions at their forward extremity, the length portions over which they are engaged by the movable and stationary die halves, and that length portion which reaches through the stationary disc carrier member.

7. A die closing unit as defined in claim 1, wherein
   at least two of the hydraulic linear actuators include, in addition to said stationary power cylinder, an auxiliary cylinder extending coaxially rearwardly from the power cylinder and enclosing a rear length portion of the associated piston rod;

the power pistons of the linear actuators have bypass passages which extend from one axial side of each piston to the other, and hydraulically actuatable valve means associated with each power piston, so as to open and close said bypass passages; and at least one auxiliary cylinder forms a pressure chamber with its enclosed piston rod rear portion which, when pressurized, causes the piston rod to move forwardly, thereby opening the injection molding die.

8. A die closing unit as defined in claim 7, wherein the rear length portion of each piston rod, extending into the auxiliary cylinder, is larger in diameter than that portion of the piston rod which extends forwardly through the stationary die carrier member, so that the piston rod acts as a differential piston, when the spaces on both sides of the power piston are pressurized while said bypass passages are held open, thereby causing the piston rod to move rearwardly to close the injection molding die.

9. A die closing unit as defined in claim 7, wherein the hydraulically actuatable valve means of each power piston includes an annular valve piston surrounding the piston rod, so as to define an annular pressure space therewith, and a hydraulic supply line leading from the outside of the linear actuator to said pressure space, via a conduit arranged in the rear portion of the piston rod.

10. A die closing unit as defined in claim 9, wherein said conduit of the hydraulic supply line includes a central rearwardly open bore in the rear portion of the piston rod and a coaxial supply tube mounted in the rear extremity of the auxiliary cylinder, so as to extend into said central bore, while forming a sliding seal therewith.

11. A die closing unit as defined in claim 7, wherein the number of hydraulic linear actuators, including power cylinders, auxiliary cylinders, power pistons and attached piston rods, is four, their longitudinal axes being arranged at the four corners of a rectangle; and at least two diagonally oppositely located auxiliary cylinders are arranged to form pressure chambers producing said forward opening motion.

12. A die closing unit as defined in claim 7, wherein one auxiliary cylinder is enlarged in the radial sense to form a control housing around its piston rod rear portion, accommodating in said housing at least one electrical limit switch which is actuated by the movements of said piston rod rear portion.

13. A die closing unit as defined in claim 12, wherein the piston rod rear portion inside said control housing has attached thereto a hub clamp which carries a switch block with a plurality of switches; and the control housing includes a longitudinally oriented cam board carrying a plurality of longitudinally adjustable switch cams which actuate said switches.

* * * * *